Dec. 10, 1935.  W. B. WILSON  2,023,657
PIPE TRUING TOOL
Filed July 23, 1934
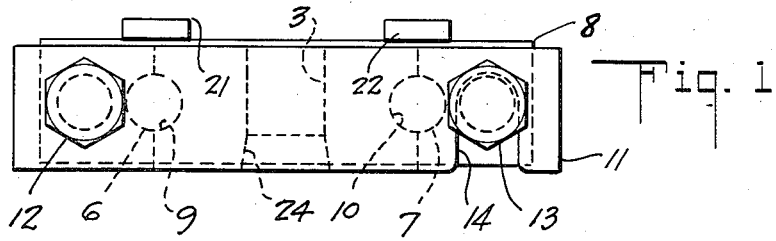
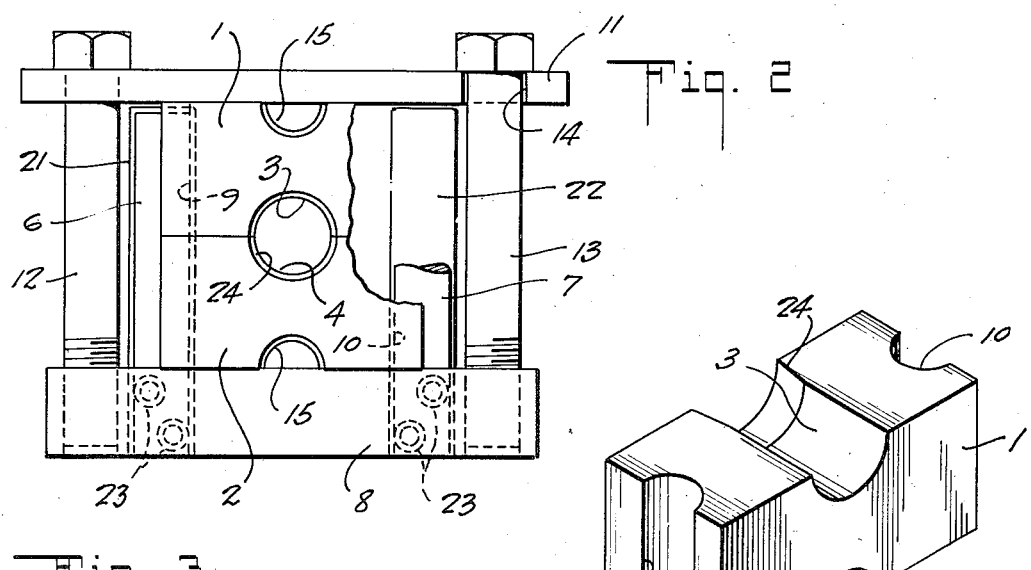
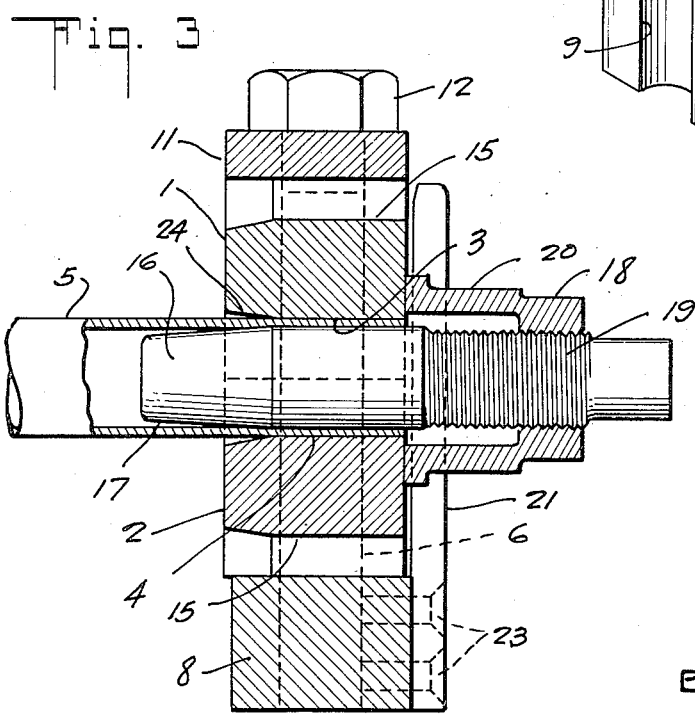
INVENTOR
William B. Wilson
BY John Flane
ATTORNEY Patented Dec. 10, 1935

2,023,657

UNITED STATES PATENT OFFICE 2,023,657

PIPE TRUING TOOL

William B. Wilson, Huntington Park, Calif., assignor of one-half to Norman B. Herman, Reno, Nev.

Application July 23, 1934, Serial No. 736,578

4 Claims. (Cl. 153—79)

This invention relates to a tool for truing pipes; especially pipes that are to be soldered into pipe fittings.

For such purposes, it is essential to maintain the external dimensions of the pipe to close tolerances so that the clearance between the fitting and the pipe can be of the right value for soldering purposes. It is also necessary to ensure that the exterior of the pipe be truly cylindrical. Such pipes are usually made from copper or brass or aluminum tubing, or from alloys of copper, brass or aluminum.

Furthermore, it is also necessary that that end of the pipe which enters the fitting be cut true so that it may seat accurately against the shoulder or flange located inside the fitting.

Since such tubing as referred to are not made sufficiently accurately to comply with these rather strict requirements, the necessity for accurate truing is apparent.

It is one of the objects of this invention to provide a simple and inexpensive tool for these purposes.

It is another object of the invention to ensure that the end of the pipe will accurately fit its seat in the fitting; and to accomplish this even when elbows are formed adjacent the end of the pipe as by bending the pipe on a curve.

This invention possesses many other advantages, and has other objects which may be made more easily apparent from a consideration of one embodiment of the invention. For this purpose there is shown a form in the drawing accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawing:

Figure 1 is a side elevation of the device partly broken away;

Fig. 2 is a top plan view thereof;

Fig. 3 is a longitudinal sectional view of the device shown in use for truing a pipe; and Fig. 4 is a pictorial representation of one of the gauging members.

An upper gauge member 1 and a lower gauge member 2 are shown having recesses 3 and 4. These recesses are substantially semi-circular and in cooperation from a true cylindrical surface of the correct or desired size for the pipe to be trued.

Both of these members 1 and 2 can be made of blocks of metal.

When the two gauging members 1 and 2 are placed in juxtaposition as shown in Fig. 1, a pipe 5 can be inserted between the members.

In order to ensure that these members 1 and 2 be maintained in proper gauging position, they can be guided as by the aid of a pair of guide pins 6 and 7 fastened to a base 8. These guide pins are adapted to be accurately accommodated in the half round grooves, such as 9, 10, formed on opposite edges of the members 1 and 2. These pins 6 and 7 thus form guides between which the truing members 1 and 2 can be placed and accurately maintained in the required position.

In order to clamp members 1 and 2 together, a clamp bar 11 is provided. This clamp bar is adapted to extend over the top member 1 and held down against it by the aid of a pair of bolts 12 and 13. Bolt 12 passes through an aperture in the bar 11 and is threaded into the base 8. Bolt 13 passes through a slot 14 in the bar 11 and is threaded into the base 8.

In order to change the gauge it is merely necessary to loosen bolts 12 and 13, and then bar 11 can be swung on the axis of bolt 12 as a pivot, thus permitting removal and replacement of the gauging members 1 and 2.

For example, these gauging members can be provided with additional gauging recesses such as 15 at those edges which are opposite the recesses 3 and 4. In this way a reversal of the positions of members 1 and 2 can serve to bring the recess 15 together to form a gauge for a different sized pipe.

When the pipe 5 is held between the members 1 and 2 as shown in Fig. 3, a member can be pressed or forced into the open end of the pipe 1, causing that end of the pipe to conform accurately with the cylindrical surface formed between recesses 3 and 4. Such a member is illustrated at 16 in Fig. 3. It can have a tapered extremity 17 to permit ready entry into the end of the pipe 5. It can be hammered or otherwise forced into place. Of course, the diameter of member 16 can be made to conform accurately with the required inside diameter of pipe 5.

In order to withdraw the member 16 from the pipe 5, a nut 18 is provided, which threads over a threaded portion 19 of member 16. This nut 18 has an extension 20 adapted to abut the contiguous plane surfaces of members 1 and 2. Thus upon rotating nut 18 in the proper direction, the member 16 can be withdrawn, the extension 20 serving to sustain the reactive force against members 1 and 2.

It is thus seen that by the cooperation of members 1, 2 and 16, the pipe 5 can be made to conform to a true cylindrical surface and of correct outside and inside diameter for use in a pipe fitting. Provisions, however, are also made to cut the end of the pipe so that it will have a truly perpendicular surface at its end and with relation to its axis. For this purpose a pair of guide bars 21—22 can be fastened to the base 8 as by screws 23. These screws can also serve appropriately for holding the guide pins 6 and 7 in place.

The groove formed between the bars 21 and the plane surfaces of the members 1 and 2 can act as a guide for a cutting tool, such as a hacksaw, for cutting the end of the pipe off square. In this way it is assured that this end of the pipe will seat accurately inside of the fitting. Furthermore, members 1 and 2 can be used to clamp the pipe in place even if the pipe 5 be bent in a curve to form an elbow; and the cutting tool can be applied to ensure a true radial cut for accurate engagement with the fitting.

By the use of the tool as described, it is apparent that the close tolerances required for soldered joint connections can be easily and quickly obtained. Of course different sized recesses in the blocks 1 and 2 and different sized members 16 must be used for various standard sized pipes.

There is also shown a slight flare 24 (Fig. 3) in recesses 3 and 4. This flare can be used if desired for expanding the end of the pipe when placed between members 1 and 2 for fitting a pipe coupling where such an expanded end is desired.

I claim:

1. In a device of the character described, a pair of truing members having cooperating recesses forming a truing gauge for the exterior of a cylindrical pipe, means for clamping said members in accurately alined position, said members having a plane surface transverse to the pipe axis, means adapted to enter into the pipe for causing it conform to the recesses, and means, forming with said plane surface, a guide for a cutting instrument to cut the end of the pipe in a plane perpendicular to the axis of the pipe.

2. In a device of the character described, a pair of truing members having cooperating recesses forming a truing gauge for the exterior of a cylindrical pipe, means for clamping said members in accurately alined position, said members having a plane surface transverse to the pipe axis, means adapted to enter into the pipe for causing it to conform to the recesses, means forming with said plane surface, a guide for a cutting instrument to cut the end of the pipe in a plane perpendicular to the axis of the pipe, and means for engaging said pipe entering means to withdraw it, said withdrawing means having a surface adapted to engage the plane surface to sustain the reactive force between the withdrawing means and the pipe entering means.

3. In a device of the character described, a pair of truing members having cooperating recesses forming a truing gauge for the exterior of a cylindrical pipe, a base, a pair of spaced guide pins fastened to the base, each of said members being provided with a groove in each side conforming with the pins so that these members may be assembled between the pins, a clamping plate for holding the members in place, and means adapted into the pipe when the pipe is held between the members for causing the pipe to conform accurately with the recesses.

4. In a device of the character described, a pair of truing members having cooperating recesses forming a truing gauge for the exterior of a cylindrical pipe, a base, a pair of spaced guide pins fastened to the base, each of said members being provided with a groove in each side conforming with the pins so that these members may be assembled between the pins, a clamping plate for holding the members in place, means adapted into the pipe when the pipe is held between the members for causing the pipe to conform accurately with the recesses, and a pair of guide bars spaced from the members to define a slot guide for a cutting tool, whereby the end of the pipe can be cut in a plane perpendicular to its axis.

WILLIAM B. WILSON.